(12) United States Patent
MacKenna et al.

(10) Patent No.: US 8,341,382 B2
(45) Date of Patent: Dec. 25, 2012

(54) MEMORY ACCELERATOR BUFFER REPLACEMENT METHOD AND SYSTEM

(75) Inventors: Craig MacKenna, Los Gatos, CA (US); Rick Varney, Campbell, CA (US); Gregory Goodhue, San Jose, CA (US)

(73) Assignee: NXP B.V., Eindhoven (NL)

(*) Notice: Subject to any disclaimer, the term of this patent is extended or adjusted under 35 U.S.C. 154(b) by 77 days.

(21) Appl. No.: 12/895,406

(22) Filed: Sep. 30, 2010

(65) Prior Publication Data
US 2012/0084532 A1 Apr. 5, 2012

(51) Int. Cl.
*G06F 9/30* (2006.01)
(52) U.S. Cl. ........................................ 712/239
(58) Field of Classification Search .................. None
See application file for complete search history.

(56) References Cited

U.S. PATENT DOCUMENTS

| 5,623,615 | A | * | 4/1997 | Salem et al. ................. 712/238 |
| 5,778,424 | A | | 7/1998 | Guy |
| 6,643,755 | B2 | | 11/2003 | Goodhue et al. |
| 6,799,264 | B2 | | 9/2004 | Goodhue et al. |
| 2005/0253858 | A1 | * | 11/2005 | Ohkami et al. ............... 345/531 |

OTHER PUBLICATIONS

Extended European Search Report, for EP application 11182837.2—1229, dated Feb. 23, 2012.

* cited by examiner

Primary Examiner — Robert Fennema

(57) ABSTRACT

A microcontroller using an optimized buffer replacement strategy comprises a memory configured to store instructions, a processor configured to execute said program instructions, and a memory accelerator operatively coupled between the processor and the memory. The memory accelerator is configured to receive an information request and overwrite the buffer from which the prefetch was initiated with the requested information when the request is fulfilled by a previously initiated prefetch operation.

17 Claims, 6 Drawing Sheets

MEMORY ACCELERATOR BUFFER REPLACEMENT METHOD AND SYSTEM

Embodiments of the invention relate to a buffer replacement strategy, and more particularly to a memory accelerator buffer replacement strategy optimized for selected microcontroller processors such as Advanced RISC Machines (ARMs).

Advanced RISC Machines are microprocessors and microcontrollers based on a reduced instruction set computer (RISC) architecture. ARMs are commonly used in mobile and embedded devices and are generally used for low power applications. Devices in which ARMs are used are generally programmed by the manufacturer and program instructions are loaded into non-volatile read only memory (ROM), such as flash, EPROM, or EEPROM. However, non-volatile memory suffers from a substantially longer access time than other storage devices, such as registers or latches. For ease of reference, the term memory is used herein to denote storage devices having a relatively long access time compared to the speed of the processor, and the term buffer is used to denote storage devices having a short access time compared to the processor speed. To minimize the delays caused by retrieving program instructions and data from relatively slow memory, cache systems including buffer techniques are commonly used to selectively store program instructions and data from the slower speed memory into the higher speed buffers for access by the processor. To minimize the amount of buffer needed, the storage size of the buffers is typically smaller than the storage size of the memory, and the buffers are overwritten to provide space for new instructions or data. Buffer replacement techniques are used to predict which program instructions or data will be accessed most frequently in order to determine which buffers may be overwritten when new instructions or data are loaded into buffers. Some processors use instruction prefetching which is a buffering technique in which subsequent instructions are read from memory into cache, while the processor is accessing a prior instruction. However, for certain processors, including those using instruction prefetching, the current buffer replacement techniques are not efficient and an optimized buffer replacement technique is needed to improve the performance of these processors.

A microcontroller using an optimized buffer replacement strategy comprises a memory configured to store instructions, a processor configured to execute the program instructions, and a memory accelerator operatively coupled between the processor and the memory. The memory accelerator is configured to receive an information request and overwrite the buffer from which the prefetch was initiated with the requested information when the request is fulfilled by a previously initiated prefetch operation.

A microcontroller in accordance with an embodiment of the invention comprises a memory accelerator operatively coupled between the processor and the memory, the memory accelerator including a plurality of buffers, the memory accelerator configured to fulfill a prefetch operation of a current instruction stream of the instructions and store information from said prefetch operation in a buffer of the plurality of buffers that initiated the prefetch operation when the prefetch operation is a result of a previously initiated prefetch operation of the current instruction stream. The memory accelerator is further configured to store information in a least recently used buffer of the plurality of buffers when no previously initiated prefetch operation of the current instruction stream is present.

A memory accelerator in accordance with an embodiment of the invention comprises a memory accelerator control module operatively coupled to the bus interface, buffer array, and memory interface, the memory accelerator control module configured to fulfill a prefetch operation of a current instruction stream of the instructions and store information from the prefetch operation in a buffer of the buffer array that caused the prefetch operation only when the prefetch operation is a result of a previously initiated prefetch operation of said current instruction stream. The memory accelerator control module is further configured to store the information in a least recently used buffer of the buffer array when no previously initiated prefetch operation of the current instruction stream is present.

A method for operating a memory system in accordance with an embodiment of the invention comprises receiving a request for information from a memory, the request being part of a prefetch of a current instruction stream, storing the information in a buffer that caused the prefetch only when the prefetch is a result of a previously initiated prefetch operation of the current instruction stream, and storing the information in a least recently used buffer when no previously initiated prefetch operation of the current instruction stream is present.

Although some embodiments of the invention are described for use with an ARM processor, it will be evident to one of ordinary skill in the art that the principles described in this disclosure are applicable to other processor architectures, such as other RISC processor designs, general purpose central processing units (CPUs), or specialized microprocessors. The term information is used herein to refer to either program instructions or data.

Other aspects and advantages of the present invention will become apparent from the following detailed description, taken in conjunction with the accompanying drawings, illustrated by way of example of the principles of the invention.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment. Rather, language referring to the features and advantages is understood to mean that a specific feature, advantage, or characteristic described in connection with an embodiment is included in at least one embodiment. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment. Thus, the phrases "in one embodiment," "in an embodiment," and similar language throughout this specification may, but do not necessarily, all refer to the same embodiment.

Figure 1:
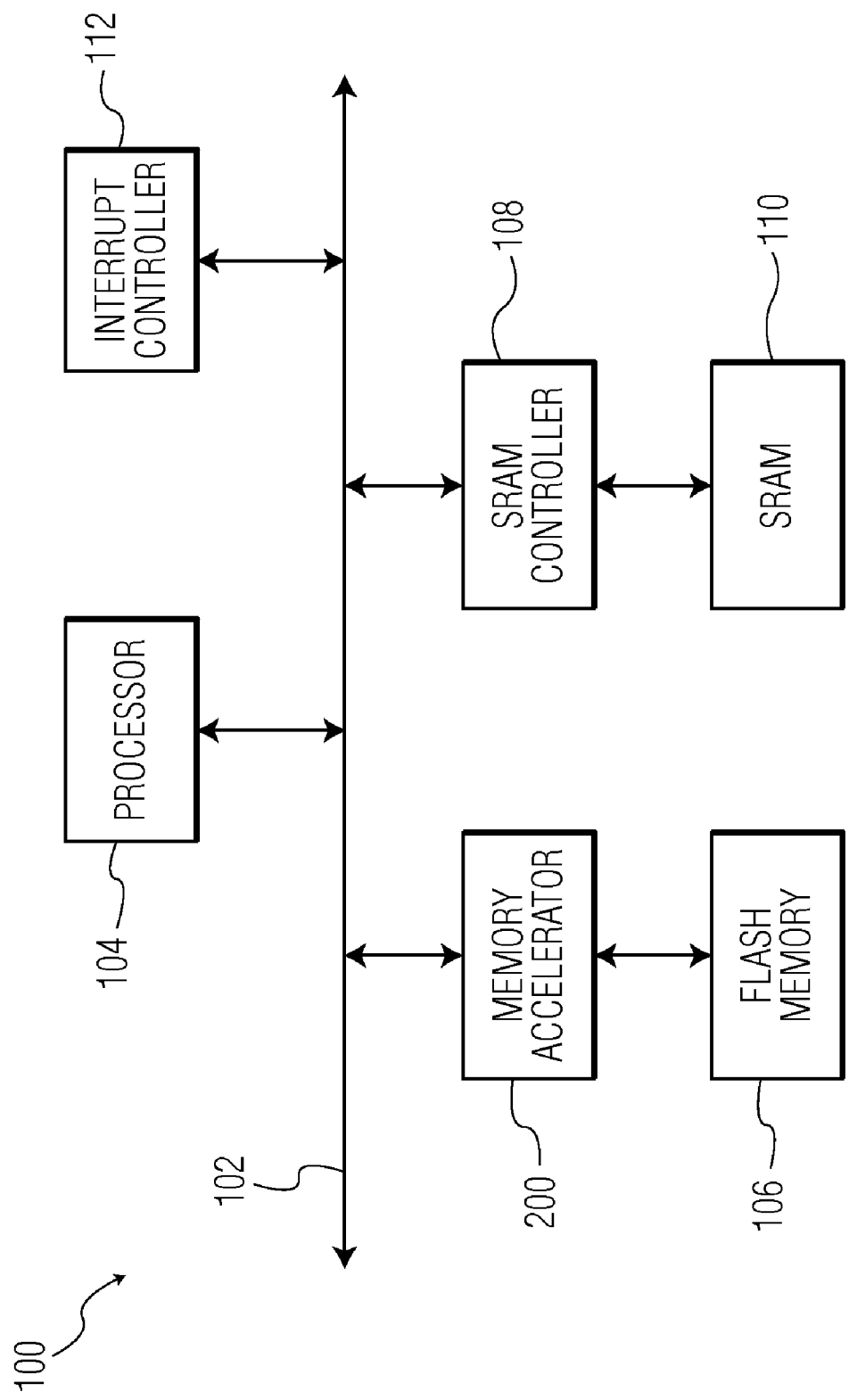
FIG. 1 depicts a block diagram of a microcontroller including a memory accelerator in accordance with an embodiment of the invention.

With reference to FIG. 1, a microcontroller 100 in accordance with an embodiment of the invention is shown. Although a microcontroller is shown, the invention is not limited to microcontrollers but can be applied to any computing system, such as a general purpose central processing unit. The microcontroller 100 includes a flash memory 106 and a processor 104 communicating with other components via a bus 102. A memory accelerator 200 is located between the bus and the flash memory. Although a flash memory is described with reference to FIG. 1, the embodiment is not limited to flash memory and other memory types may also be used. The flash memory typically contains program instructions to perform the intended functions. The program instructions may be, for example, programmed by a user of the microcontroller and/or pre-programmed by a manufacturer of the microcontroller.

In the example of FIG. 1, the memory accelerator 200 is configured to improve memory access characteristics of the processor. The memory accelerator contains memory elements, such as, in a non-limiting example, buffers having a faster access time than the flash memory 106. In an embodiment, a buffer stores more than one instruction although this is not a requirement. Preferably, the access time for retrieving an instruction from the memory elements of the accelerator is less than the time required for the processor to execute the instruction. The memory accelerator is configured to store accessed instructions in its buffers in accordance with specific buffer replacement strategies, so as to improve processor performance by minimizing access frequency to the flash memory. Other components may be connected to the bus 102, such as, for example, an interrupt controller 112 to call interrupt service routines and functions of higher level instruction streams. The microcontroller 100 may further comprise or be connected to read-write memory, such as for example static random access memory 110 (SRAM) coupled to the bus via an SRAM controller 108. The read-write memory may contain transient data and information. Additionally, other on-chip or off-chip peripherals may be connected to the bus.

In the example of FIG. 1, a parental buffer replacement strategy is used to improve the performance of a processor employing instruction prefetching. In the parental replacement strategy, the number of buffers used by a current instruction stream is minimized, allowing for more information from higher level instruction streams to be stored in the buffers. An instruction stream is considered a sequence of instructions relating to a program executable by a processor, where the sequence of instructions is stored in a memory. Instruction prefetching may be controlled by a prefetch scheme, which determines the order in which prefetching of instructions occurs. The instruction prefetch order may, for example, occur in the program order or may be part of a branch prediction where the processor tries to predict the instruction that will most likely be requested next. When an instruction prefetch completes, the prefetched instruction is not stored in a buffer until a fetch request by the processor for a previous instruction prefetch of the same instruction stream as the current instruction prefetch is fulfilled. This is to avoid that the previously prefetched instruction is overwritten before it is requested by the processor. In an embodiment, the memory simply continues to provide the last information (e.g., instruction) requested until other information is requested.

A prefetch for a new instruction may be requested by the processor following a prefetch of a previous instruction of the same instruction stream. The new instruction to be prefetched may be determined by a prefetch scheme, as described above. Initiation of the new instruction prefetch may be a direct result of the completion of the previous instruction prefetch, or may be caused by the processor requesting the previous instruction. When a new instruction prefetch is performed following a previously initiated prefetch of the same instruction stream, the new instruction is stored in the buffer whose contents resulted in the new instruction prefetch being initiated (i.e. the buffer containing the previously prefetched instruction of the same instruction stream as the new instruction). For example, the new instruction is prefetched following the previously initiated prefetch as defined by a prefetch scheme (i.e. given by the program order or by branch prediction), where the new instruction and the instruction from the previously initiated prefetch are both part of the same program. When the processor requests an instruction fetch or prefetch relating to a different instruction stream, the fetched/prefetched instruction may be stored in the least recently used buffer, if the least recently used buffer is not about to be used, or may be stored in the next to least recently used buffer if the least recently used buffer is about to be used.

Figure 2:
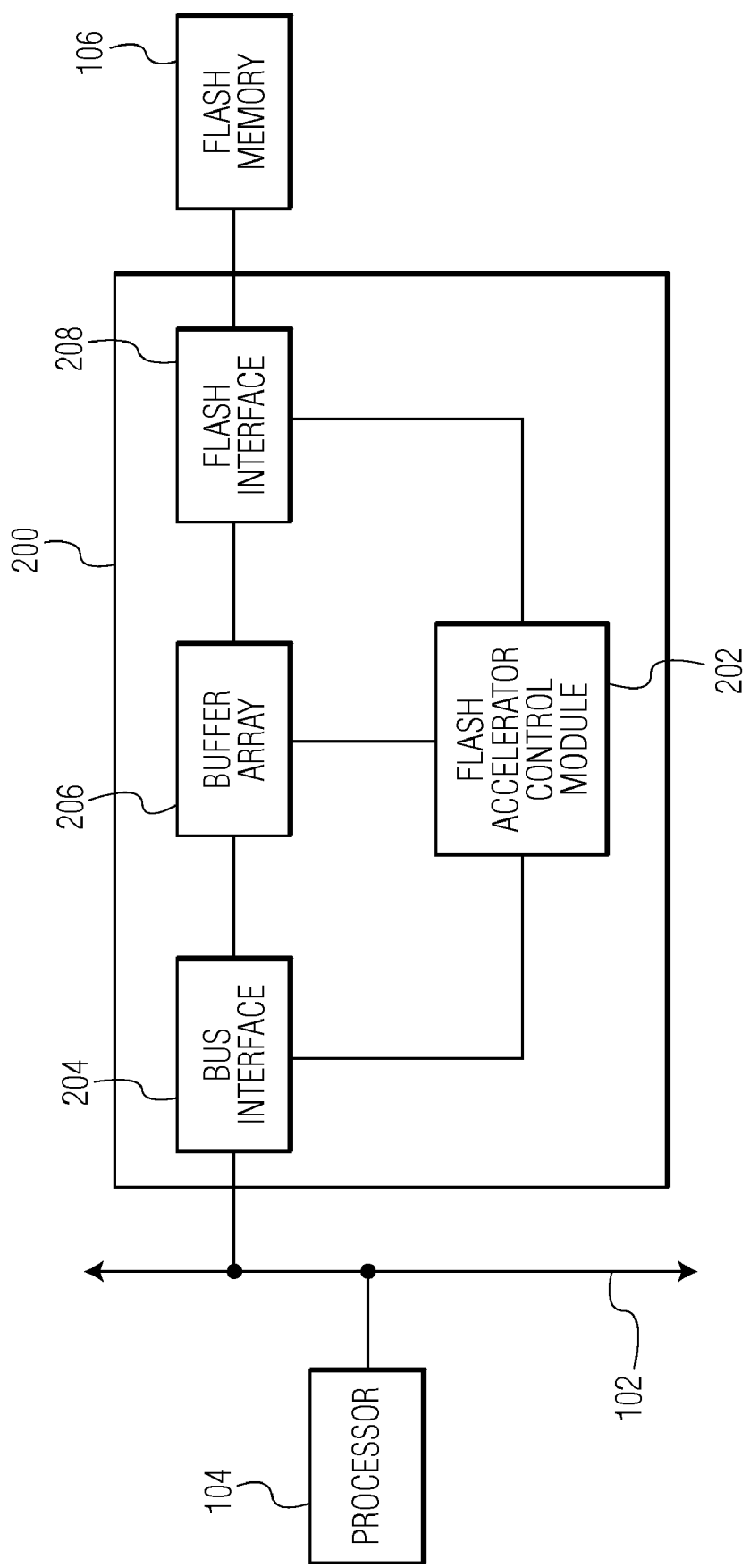
FIG. 2 depicts a block diagram of a memory accelerator disposed between a processor and a memory in accordance with an embodiment of the invention.

Turning now to FIG. 2, a memory accelerator 200 is operatively coupled between a bus 102 and a flash memory 106 in accordance with an embodiment of the invention. The bus may be a high performance bus, such as an Advanced High-performance bus (AHB) and may be coupled to a processor such as an ARM type processor. The memory accelerator includes a bus interface 204 for communicating with the bus 102, a buffer array 206 for storing information (e.g., instructions and/or non-instruction data), a flash interface 208 for communicating with the flash memory, and a flash accelerator control module 202 for controlling memory accesses and for buffering operations including applying the parental replacement strategy, as discussed with reference to FIG. 1. The buffer array may be a set of buffers, for example, a standard cache or a set of latches as used in other memory accelerators.

In the example of FIG. 2, the flash accelerator control module 202 implements the desired buffer replacement strategy based on the type of access to the memory 106. Buffers may be allocated in response to information read from the memory as a prefetch of an instruction stream, or in response to a request by the processor 104 for data that is not already stored in any buffer and is not in the process of being prefetched. When information is read from the memory as a prefetch, the parental replacement strategy uses the buffer whose contents initiated the prefetch operation (i.e. a continuing instruction stream) to store the information from that operation, as described with reference to FIG. 1.

Figure 3A:
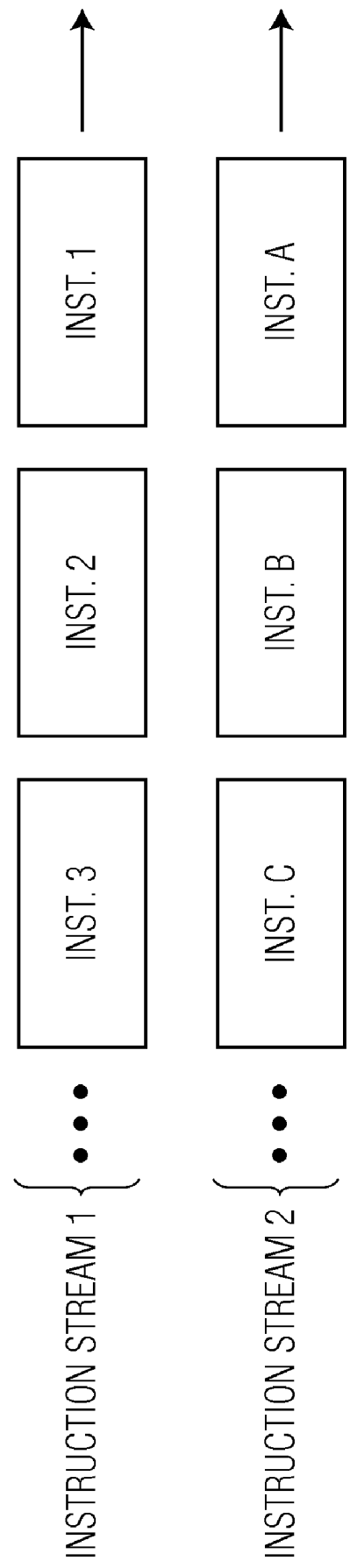
FIG. 3A depicts a block diagram of instructions contained in instruction streams.

FIG. 3A depicts instructions contained in instruction streams. In FIG. 3A, two instruction streams are depicted. In a non-limiting example, instruction stream 1 is an instruction stream of a prefetch operation and the instruction stream includes the following instructions: inst. 1, inst. 2, inst. 3, etc. A prefetch scheme may be used to determine the order in which the instructions are prefetched, as described with reference to FIG. 1. In FIG. 3A, inst. 1 is prefetched first, followed by prefetch of inst. 2 once inst. 1 prefetch is completed, and so on. In another non-limiting example, instruction stream 2 is an interrupt service routine triggered by the processor receiving an interrupt. Upon receiving the interrupt, the processor may pause any current execution of an instruction stream and begin execution of the interrupt service routine. The instruction stream 2 includes instructions inst. A, inst. B, inst. C, etc.

Figure 3B:
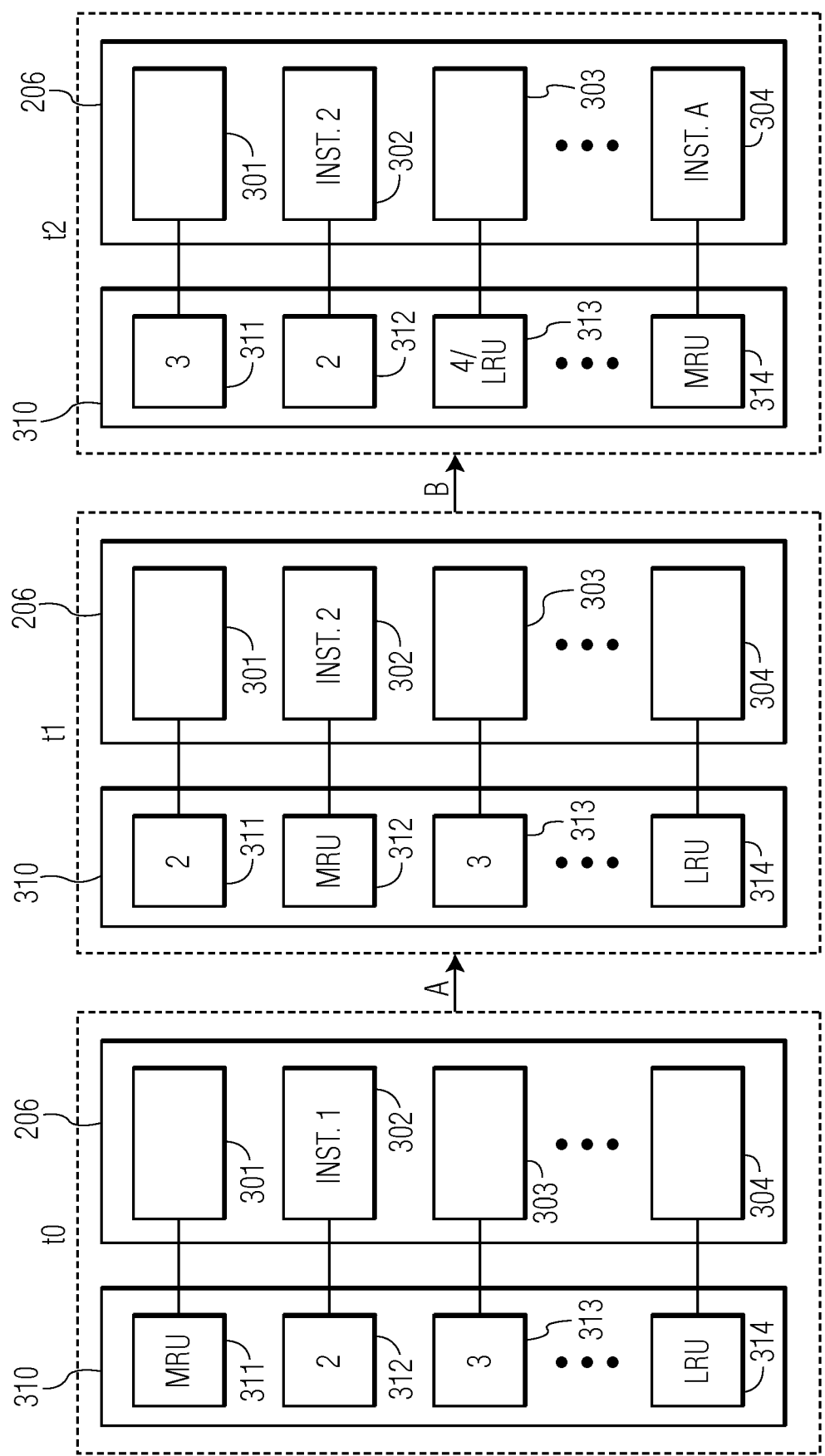
FIG. 3B depicts a block diagram of a buffer array at different stages following processor requests.

FIG. 3B depicts a buffer array 206 with the corresponding usage register 310 at different stages in time following processor requests for instructions contained in instruction streams, such as the instruction streams as depicted in FIG. 3A. The buffer array comprises a set of buffers 301, 302, 303, 304, etc, which can be used to store information. Although four buffers are depicted in the example of FIG. 3B, this number is purely illustrative and the buffer array is not limited to four and may contain more (or less) buffers. Each buffer may be defined by an address range of a storage means, or a set of latches, or any other means for defining specific locations for buffers in high speed memory. Each buffer may have a corresponding register 311-314 of the usage register array, where the register array determines the order of usage of the buffers.

In the example of FIG. 3B, at time t0, the buffer 302 contains instruction inst. 1. For ease of reference, the contents of buffers 301, 303, and 304 are not shown and these buffers may or may not contain information. The usage order at t0 as given by the usage register array is purely illustrative and is chosen at random and may be based on any previous buffer usage. In this example, buffer 301 represents the Most Recently Used (MRU) buffer, buffer 302 represents the second to most recently used buffer, etc, whereby buffer 304 represents the Least Recently Used (LRU) buffer. Event A represents a request for a prefetch of instruction inst. 2, where inst. 2 belongs to the same instruction stream as inst. 1. The inst. 2 prefetch is triggered by the presence of instruction inst. 1 in the buffer 304. The inst. 2 prefetch may be initiated once the inst. 1 prefetch is completed. Alternatively, the inst. 2 prefetch is only initiated once inst. 1 has been fetched by the processor or the processor has indicated that inst. 1 was not needed (e.g., the processor requests some other instruction and/or data). Because inst. 2 is part of the same instruction stream as inst. 1, the buffer array 206 and the register array are updated according to the parental replacement strategy. Thus, at time t1, the instruction inst. 2 is placed in buffer 302, i.e. the same buffer that contained inst. 1 at time t0. Instruction inst. 2 therefore overwrites the information (inst. 1) in the buffer that initiated the inst. 2 prefetch. Additionally, the usage register array is updated. The currently altered buffer 302 is set to MRU, whereas the buffers that previously preceded the buffer 302 (i.e. buffers that were most recently used than buffer 302) are set to one level lower in usage order (i.e. 'older'). The registers of the buffers that were less frequently used at time t0 may be unaltered or may be set to one level lower in usage order. The parental replacement strategy allows minimization of the amount of buffers used for the current instruction stream 1, thereby allowing more information to be saved from other instruction streams, such as instruction stream 2. Event B represents a request by the processor for an instruction inst. A belonging to a different instruction stream than instruction inst. 2. Because inst. A belongs to a different instruction stream and initiation of the request for inst. A is independent of inst. 2 in buffer 302, a replacement strategy other than parental displacement is used. The strategy used may be, for example, an LRU strategy, whereby the LRU buffer as determined by the usage registers is used to store inst. A. The usage registers are updated as before. In the example where four registers are used, the usage register 313 corresponding to the buffer 303 is set to LRU. It should be noted that the order and definitions of the events A and B are selected for illustrative purposes only.

Figure 4:
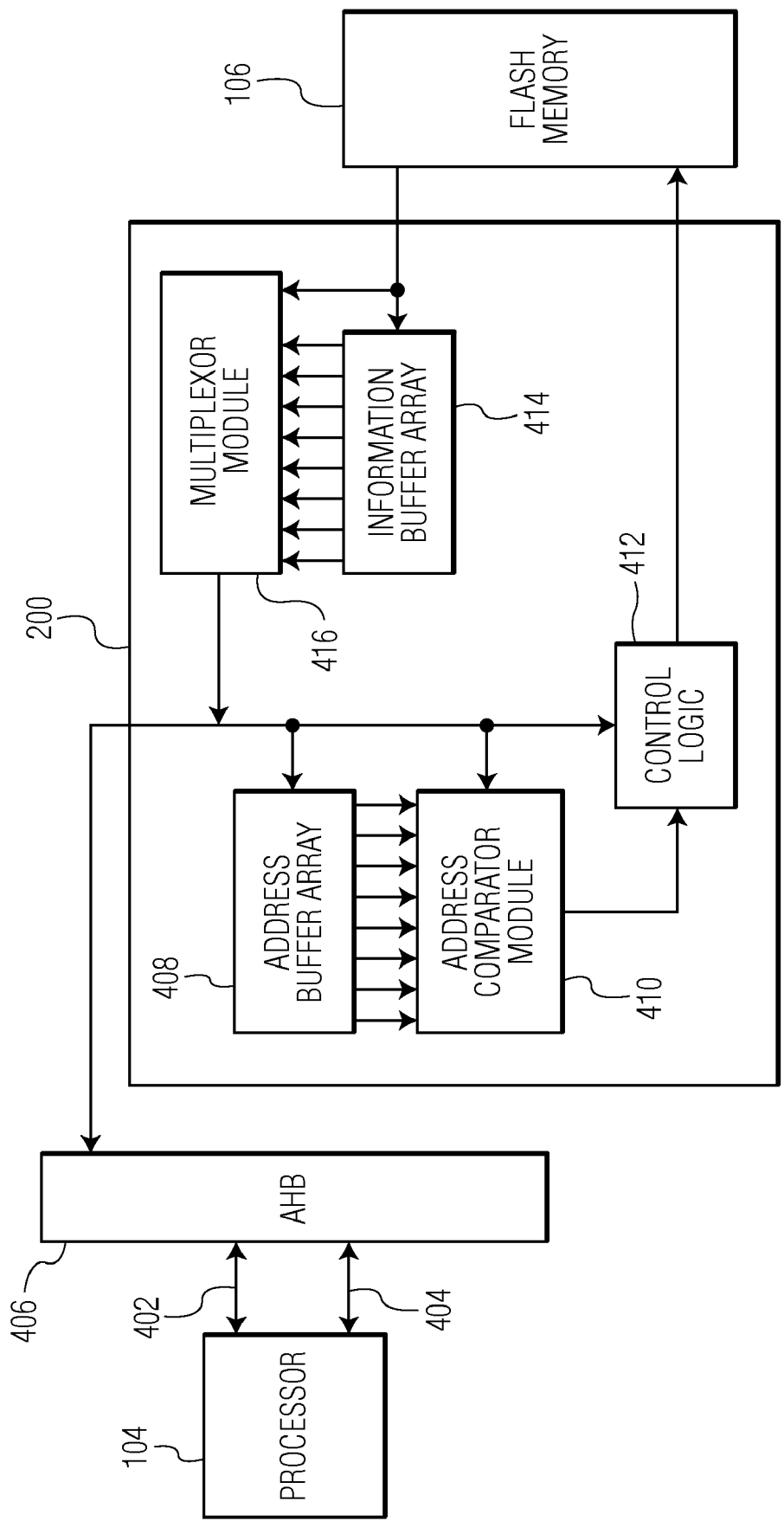
FIG. 4 depicts a block diagram of a detailed view of a memory accelerator in accordance with an embodiment of the invention.

FIG. 4 depicts a memory accelerator 200 coupled between a flash memory 106 and a processor 104 (e.g. an ARM processor) via an Advanced High-performance Bus (AHB) 406 in accordance with an embodiment of the invention. The memory accelerator includes an address buffer array 408, an address comparator module 410, a control logic 412, an information buffer array 414, and a multiplexor module 416. The memory accelerator may further include a plurality of registers associated with each buffer to keep track of the order of usage, for example for the Least Recently Used (LRU) strategy, as described above with reference to FIG. 3.

In the example of FIG. 4, the processor 104 is connected to the AHB 406 via a DCode bus 402 and an ICode bus 404. Data accesses are performed over the DCode bus, whereas Instruction fetches are performed over the ICode bus. However, other memory maps may be used, such as a common system bus for both instruction fetches and data accesses. A request for access to an address of the flash memory is received at the address buffer array 408 from the processor. The address comparator module 410 may remap addresses received from the processor to an address set in a remap register. The remapped address is received by the control logic 412. The control logic then determines whether the information corresponding to the address given by the request already exists in the information buffer array from a previous request, whether the request is already fulfilled by a previously initiated prefetch operation corresponding to the same instruction stream as the current request, or whether the information is neither already buffered nor fulfilled by a previous prefetch. If the request is fulfilled by a previously initiated prefetch operation, the buffer from which the prefetch was initiated is overwritten with the requested information when the requested information becomes available, as previously described. The appropriate information contained in the information buffer array is forwarded to the ARM processor through multiplexor module 416 as determined by the control logic.

Each buffer of the information buffer array 414 may be marked with the type of information it contains, that is whether the buffer contains an instruction or non-instruction data. During the buffer replacement strategies, information in a buffer that is overwritten does not necessarily need to be of the same type (data/instruction) as the information that the buffer previously held.

Figure 5:
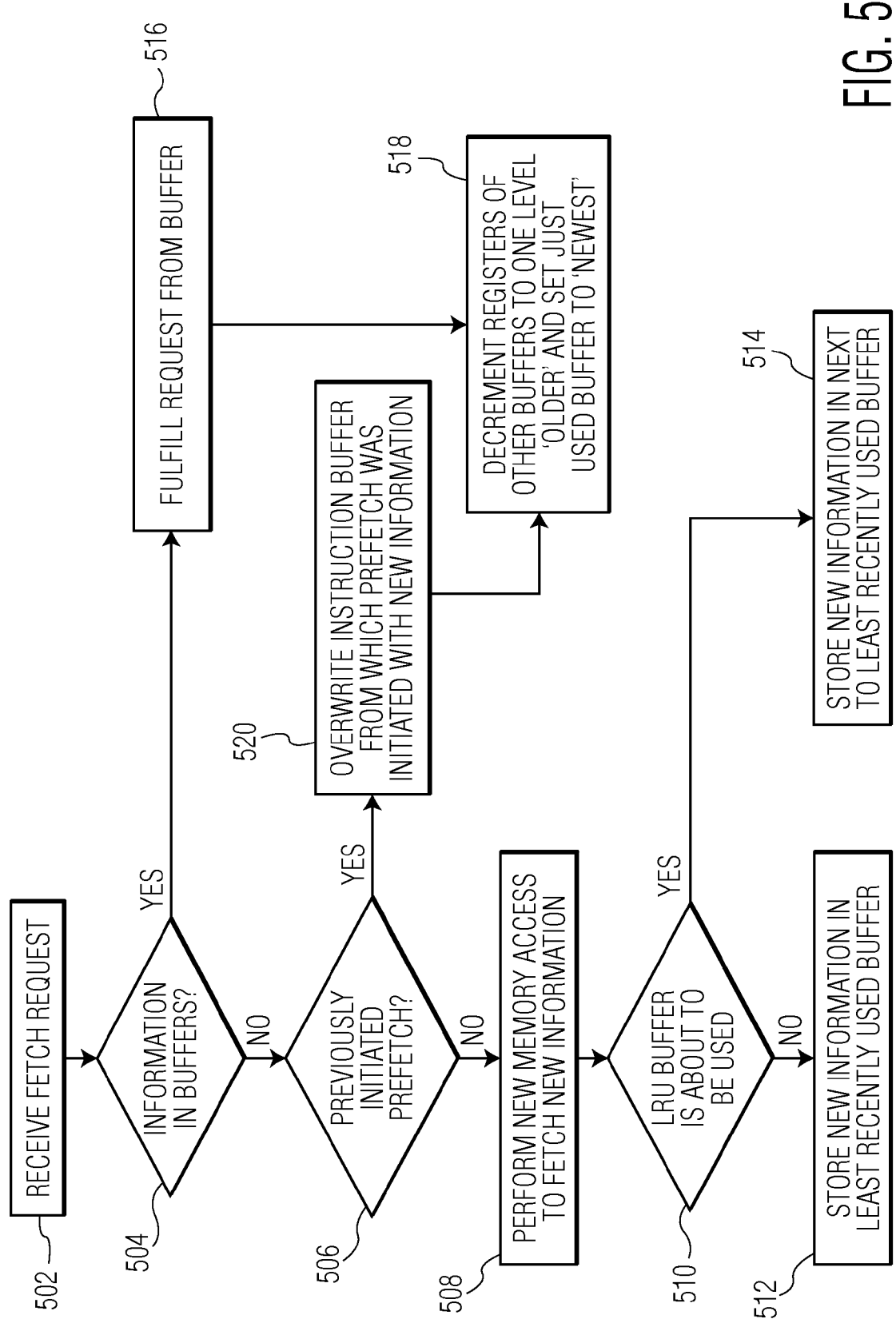
FIG. 5 illustrates a flow diagram of a buffer replacement strategy in accordance with an embodiment of the invention.

A method for a buffer replacement in a memory accelerator in accordance with an embodiment of the invention is now described with reference to FIG. 5. In an embodiment, the method for buffer replacement is applied specifically to instruction fetch/prefetch operations but not to non-instruction data fetch/prefetch operations. At block 502, a fetch request is received for an address in the memory. Next, at decision block 504, it is determined whether the information corresponding to the fetch request is already buffered from a previous request. If the information is not present in one of the buffers of the memory accelerator, the flowchart continues to decision block 506 where it is determined whether the fetch request is fulfilled by a previously initiated prefetch operation. If the fetch request is not fulfilled by a previously initiated prefetch operation, the flowchart continues to block 508 where a new memory access is performed to fetch new information corresponding to the fetch request. Next, at decision block 510, it is determined whether the Least Recently Used (LRU) buffer is about to be used as indicated by a prefetch address prediction. If the LRU buffer is not about to be used, the flowchart continues to block 512 where the new information corresponding to the fetch request is stored in the LRU buffer as identified by the registers for the LRU strategy, as described above with reference to FIG. 4. If the LRU buffer is about to be used, the flowchart continues to block 514 where the new information is stored in the next to least recently used buffer.

If, at decision block 504, it is determined that the requested information is already in a buffer of the memory accelerator from a previous request, the flowchart continues to block 516 where the fetch request is fulfilled from the buffer containing the requested information. The flowchart then continues to block 518 where the registers of the other buffers are decremented to become one level 'older' and the register of the buffer containing the requested data is set to the 'newest' value, as described above with reference to FIG. 3.

If, at decision block 506, it is determined that the fetch request is fulfilled by a previously initiated prefetch, then the flowchart continues to block 520 where the buffer from which the prefetch was initiated is overwritten with the new information. The flowchart then continues to block 518 where the registers of the buffers other than the buffer from which the prefetch was initiated are decremented to become one level 'older' and the register of the buffer containing the requested data is set to the 'newest' value.

Although the operations of the method herein are shown and described in a particular order, the order of the operations of the method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

In addition, although specific embodiments of the invention that have been described or depicted include several components described or depicted herein, other embodiments of the invention may include fewer or more components to implement less or more feature.

Furthermore, although specific embodiments of the invention have been described and depicted, the invention is not to be limited to the specific forms or arrangements of parts so described and depicted. The scope of the invention is to be defined by the claims appended hereto and their equivalents.

What is claimed is:

1. A microcontroller comprising:
   a memory configured to store instructions including a current instruction stream;
   a processor configured to execute said instructions; and
   a memory accelerator operatively coupled between the processor and the memory, the memory accelerator including a buffer containing a previous instruction from a previously initiated prefetch, the memory accelerator configured to prefetch a new instruction of the current instruction stream and to overwrite the previous instruction in said buffer with the new instruction when said prefetch of the new instruction is initiated as a result of the previously initiated prefetch and when the new instruction directly follows the previous instruction in an order defined by a prefetch scheme;
   wherein the memory accelerator is configured to store said new instruction in a least recently used buffer when the previous instruction is not part of said current instruction stream.

2. The microcontroller of claim 1, wherein a next to least recently used buffer is used to store the new instruction when the previous instruction is not part of said current instruction stream and when a least recently used buffer is about to be used.

3. The microcontroller of claim 1, wherein the prefetch of the new instruction is fulfilled by an existing buffer when said new instruction is already in said existing buffer.

4. The microcontroller of claim 1, wherein the processor is an Advanced RISC (Reduced Instruction Set Computer) Machine.

5. The microcontroller of claim 1, wherein the memory is a flash memory.

6. The microcontroller of claim 1, wherein the previous instruction belongs to the current instruction stream and wherein the new instruction is not stored in said buffer until a fetch request by the processor for the previous instruction is fulfilled.

7. The microcontroller of claim 1, wherein the prefetch sequence defined by the prefetch scheme is given by the program order.

8. The microcontroller of claim 7, wherein the prefetch sequence defined by the prefetch scheme is given by a branch prediction.

9. A memory accelerator comprising:
   a bus interface for communicating with a processor coupled to said bus;
   a memory interface for communicating with a memory, said memory including instructions;
   a buffer array coupled between said bus interface and said memory interface; and
   a memory accelerator control module operatively coupled to said bus interface, buffer array, and memory interface, the memory accelerator control module configured to fulfill a current prefetch operation of a current instruction stream of said instructions and to overwrite a content of a buffer of the buffer array that caused said current prefetch operation with information from said current prefetch operation only when said current prefetch operation is a result of a previously initiated prefetch operation of said current instruction stream, wherein the previously initiated prefetch operation directly precedes the current prefetch operation in a prefetch sequence defined by a prefetch scheme;
   wherein the memory accelerator control module is configured to store said information in a least recently used buffer of said buffer array when no previously initiated prefetch operation of said current instruction stream is present.

10. The memory accelerator of claim 9, wherein a next to least recently used buffer of said plurality of buffers is used when no previously initiated prefetch operation of said current instruction stream is present and when a least recently used buffer is about to be used.

11. The memory accelerator of claim 9, wherein the prefetch operation is fulfilled by an existing buffer when said information is already in said existing buffer.

12. The memory accelerator of claim 9, wherein the processor is an Advanced RISC (Reduced Instruction Set Computer) Machine.

13. The memory accelerator of claim 9, wherein the memory is a flash memory.

14. A method for operating a memory system, the method comprising:
  requesting a new instruction from a memory; and
  storing the new instruction in a buffer array according to a buffer replacement strategy, the buffer array including a first buffer containing a previous instruction and a second buffer different from the first buffer, wherein the buffer replacement strategy includes:
    a parental replacement strategy wherein, if the request for the new instruction is initiated as a result of the previous instruction and the new instruction and the previous instruction belong to a same first instruction stream, then the new instruction is stored in the first buffer and the previous instruction is overwritten with the new instruction, where the new instruction directly follows the previous instruction in an order defined by a prefetch scheme, and
    a second replacement strategy wherein, if the new instruction and the previous instruction belong to different instruction streams, then the new instruction is stored in the second buffer.

15. The method of claim 14, wherein the second replacement strategy is a least recently used strategy and the second buffer represents a least recently used buffer.

16. The method of claim 14, wherein the first instruction stream is a prefetch operation.

17. The method of claim 14, wherein the second replacement strategy further includes: if the previous instruction belongs to an instruction stream of a prefetch operation and the new instruction belongs to an instruction stream of an interrupt service routine, then the new instruction is stored in a least recently used buffer.

* * * * *